United States Patent [19]
O'Grady

[11] Patent Number: 5,314,154
[45] Date of Patent: May 24, 1994

[54] THROUGH HOLE STRAP MOUNT

[75] Inventor: Bernard J. O'Grady, Oak Lawn, Ill.

[73] Assignee: Panduit Corp., Tinley Park, Ill.

[21] Appl. No.: 960,973

[22] Filed: Oct. 14, 1992

[51] Int. Cl.[5] .............................................. F16L 3/00
[52] U.S. Cl. ................................ 248/231.9; 248/68.1; 248/74.3
[58] Field of Search ................. 248/68.1, 71, 73, 74.3, 248/231.9

[56] References Cited
U.S. PATENT DOCUMENTS

| | | | |
|---|---|---|---|
| 1,710,157 | 4/1929 | Felix | 248/74.3 |
| 2,919,089 | 12/1959 | Durham | 248/71 |
| 3,087,700 | 4/1963 | Carpenter et al. | 248/74.3 |
| 3,913,876 | 10/1975 | McSherry | 248/73 X |
| 4,638,966 | 1/1987 | Ford | 248/74.3 X |

FOREIGN PATENT DOCUMENTS

| | | | |
|---|---|---|---|
| 0624676 | 8/1961 | Canada | 248/71 |
| 0085723 | 9/1958 | Denmark | 248/68.1 |

Primary Examiner—Richard K. Seidel
Assistant Examiner—Raymond D. Woods
Attorney, Agent, or Firm—Charles R. Wentzel; Mark D. Hilliard; Robert A. McCann

[57] ABSTRACT

A strap mount for holding a bundle of wires against a hole in a structure such as a wall or ceiling. The strap mount includes a thin, closed loop mount member having a pair of substantially parallel extended end sections and a central loop section including a passageway. The shape of the mount allows for it, and an engaged strap, to pass completely through a hole in a structure and then be oriented so that the strap mount will be prevented from returning through the hole. When the strap mount is held up against the structure, the bundle can then be secured by tightening the cable strap around it.

8 Claims, 3 Drawing Sheets

1

THROUGH HOLE STRAP MOUNT

TECHNICAL FIELD

The present invention relates generally to a strap mount for mounting a bundle of wires contained by a strap against a structure and more particularly to a strap mount, having a passageway for passing a cable tie strap through, wherein the strap mount has a shape that allows it to be inserted through a hole in the structure, but, that can be positioned so that the strap mount is prevented from coming back out through the hole, thus allowing a bundle to be secured against the structure.

BACKGROUND OF THE INVENTION

In the electrical industry it is often necessary to mount a bundle of wires against a variety of structures such as walls or ceilings. When the structure is vertical or the bundle is to be mounted below a horizontal surface of the structure, such as on a ceiling, it can be very difficult to properly secure the bundle. In addition, it is often necessary to have access to both sides of the wall in order to secure the strap containing the bundle in situations as described above. However, having access to both sides of a structure is frequently difficult to obtain and therefore, it is difficult to properly secure the bundle to the structure.

SUMMARY OF THE INVENTION

It is therefore an object of the present invention to provide a strap mount that can secure a bundle of wires against a hole in a structure such as a wall or ceiling. It is another object of the present invention to provide a strap mount that allows for the mounting of a bundle to a structure without requiring access to both sides of the structure. It is also an object of the present invention to provide a strap mount that includes a mount member having a pair of extended end sections and a central section including a passageway therebetween, wherein at least one of the extended end sections is transverse to a plane of the central section. In general, a strap mount includes a mount member having a generally elongated loop configuration with a pair of spaced apart substantially parallel extended end sections and a central loop section therebetween including a passageway.

DESCRIPTION OF THE PREFERRED EMBODIMENT

Figure 3:
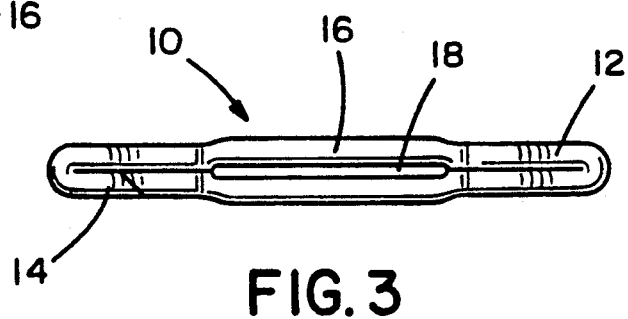
FIG. 3 is a top view of the strap mount of FIG. 1.
Figure 5:
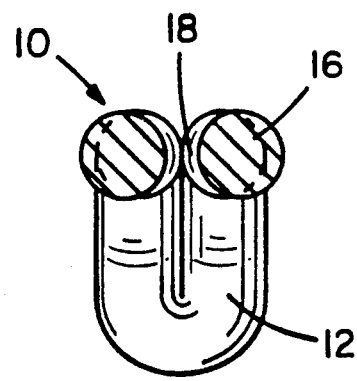
FIG. 5 is an axial view of the strap mount of FIG. 1 along the line 5—5 in FIG. 4.
Figure 4:
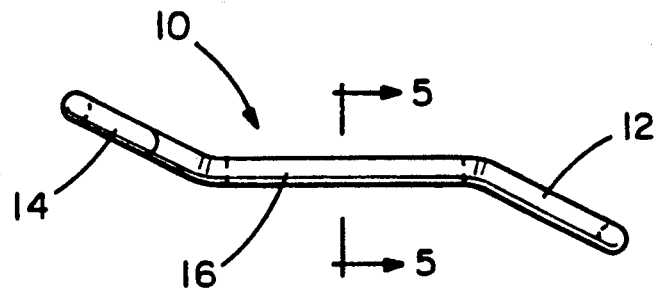
FIG. 4 is a side view of the strap mount of FIG. 1.
Figure 6:
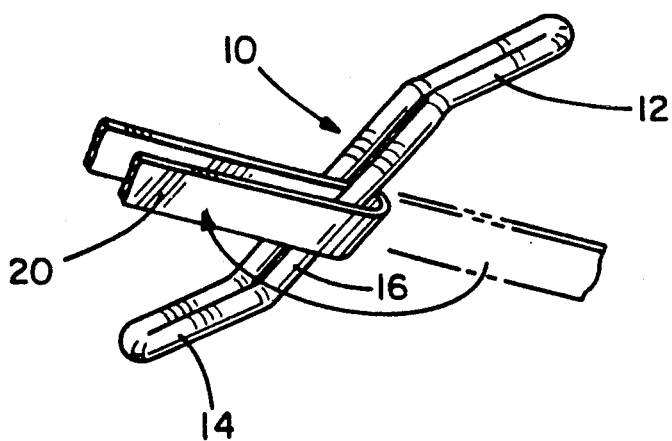
FIG. 6 is a perspective view of the strap mount of FIG. 1 having a cable tie inserted through and folded back upon itself.
Figure 7:
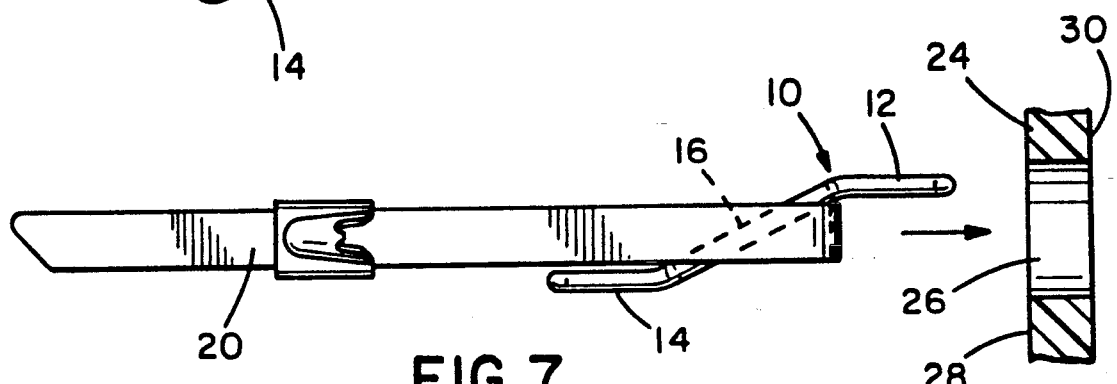
FIG. 7 is a side view of the strap mount of FIG. 1 engaged with a cable tie and entering a hole in the structure.
Figure 8:
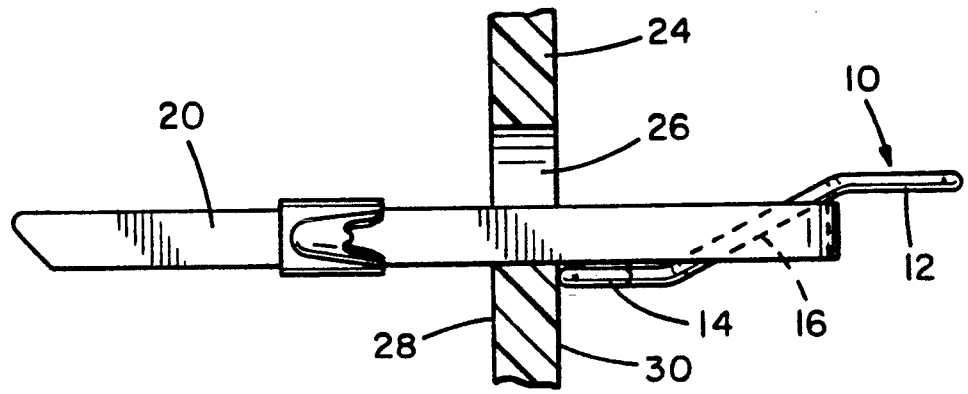
FIG. 8 is a side view of the strap mount of FIG. 7 after passing through the hole in the structure.
Figure 9:
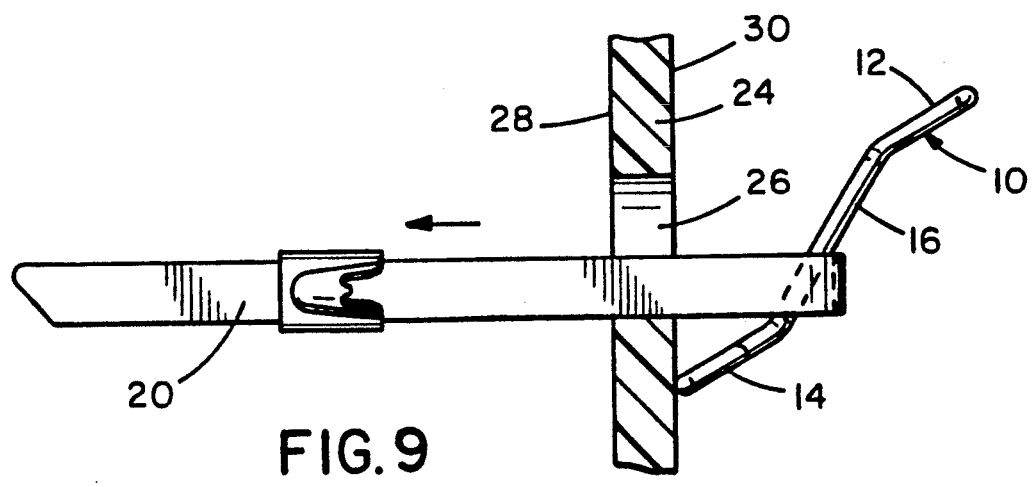
FIG. 9 is a side view of the strap mount of FIG. 7 being pulled back against the structure.
Figure 10:
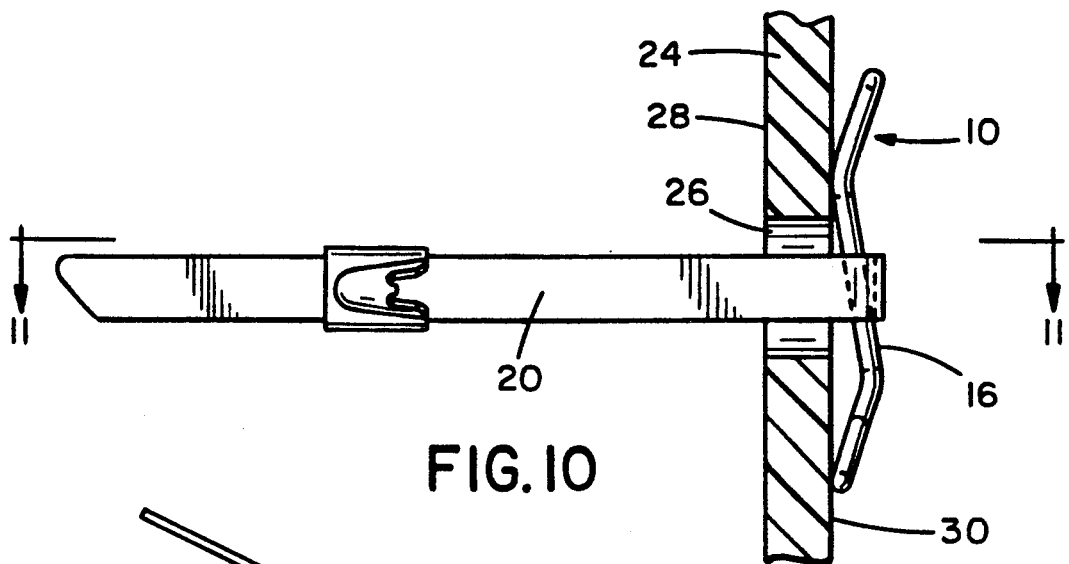
FIG. 10 is a side view of the strap mount of FIG. 7 firmly held against the structure.
Figure 11:
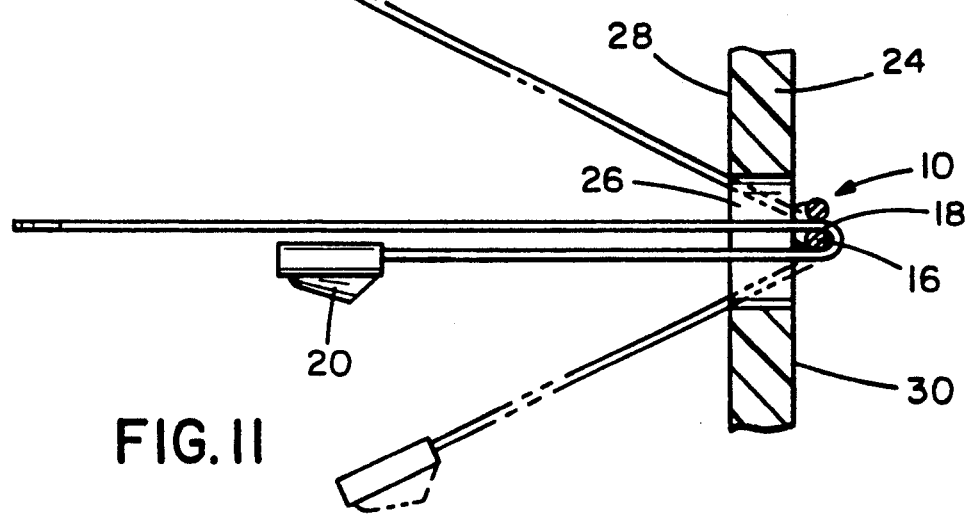
FIG. 11 is a view of the strap mount of FIG. 7 along the line 11—11 in FIG. 10.

A strap mount embodying the concept of the present invention is designated generally by the reference numeral 10 in the accompanying drawings. Strap mount 10 is formed by having a pair of ends, of a rod-like piece of metal such as an annealed stainless steel, folded back on the piece of metal a sufficient distance so that the ends of the rod-like metal piece meet. A closed loop is formed by either spot welding the ends together or by having the ends cut at opposing 45 degree angles and pressed tightly together. As can be seen in FIG. 3, a passageway 18 of strap mount 10 is formed in a central section 16 either by presetting offsets in the rod-like stainless steel prior to the folding back of the ends or by forming it around an arbor as the metal is folded back upon itself. A pair of extended end sections are formed by pressing the folded back metal rods together outside of where passageway 18 is formed. These extended end sections constitute a leading end section 12 and a trailing end section 14. Leading end section 12 and trailing end section 14 are spaced at a distance, but substantially parallel to each other. They are integrally connected with central section 16 which is angled therebetween. As seen in FIG. 4, central section 16 is at an oblique angle to the parallel extended end sections 12, 14. Central section 16 includes elliptical passageway 18 which allows a cable tie strap 20 to be passed through. As can be seen in FIG. 6, cable tie strap 20, which is to be looped around a bundle of wires 22 to be secured against a structure 24, is inserted through passageway 18 of strap mount 10 and bent back upon itself so that there are two cable tie strap sections parallel to each other with strap mount 10 resting at the bent portion of cable tie strap 20. Prior to inserting strap mount 10 into a hole 26 of structure 24, it is necessary to orient strap mount 10 on cable tie strap 20 as seen in FIG. 7 so that the overall width dimension of strap mount 10 is minimized by having the leading end and trailing end sections 12, 14 of the strap mount 10 substantially parallel with the sides of the cable tie strap 20. Strap mount 10 is then passed completely through hole 26 by inserting it through the insertion side 28 of structure 24 with leading end section 12 going first. After strap mount 10 has been fully passed through hole 26 of structure 24, the cable tie strap 20 is forced towards the side of hole 26 nearest trailing end section 14 of strap mount 10 as seen in FIG. 8. Cable tie strap 20 is then pulled back, thus causing strap mount 10 to pivot around the point where trailing end section 14 abuts a retention side 30 of structure 24, as shown in FIG. 9, until strap mount 10 has its extended end sections substantially perpendicular to the axis of the hole, and is forced up against retention side 30 of the structure 24 as seen in FIG. 10. The greater length dimension of strap mount 10 prevents strap mount 10 from being pulled back through hole 26 of structure 24 by having leading end and trailing end sections 12, 14 abut retention side 30 of structure 24. Bundle 22 is then secured to structure 24 by tying off cable tie strap 20 around it.

It should be noted that the strap mount 10 is multi-directional. That is, it could be oriented in any number of directions both prior to and subsequent to its insertion through the hole in the structure. This enables the strap mount to be easily used in a variety of holes and even in crowded or close fitting situations.

Figure 1:
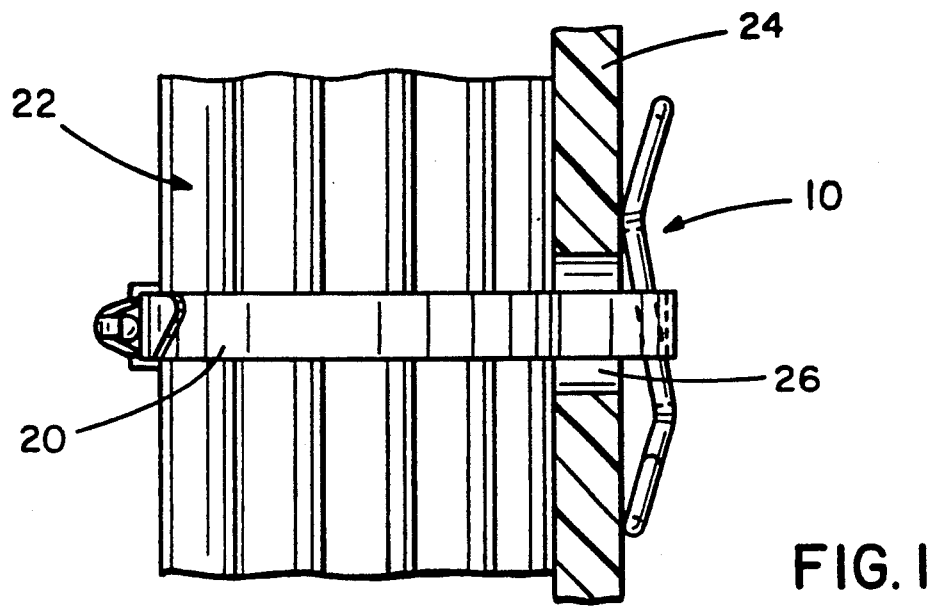
FIG. 1 is a side view of a strap mount engaged with a cable tie to secure a bundle of wires embodying the concept of the present invention.
Figure 2:
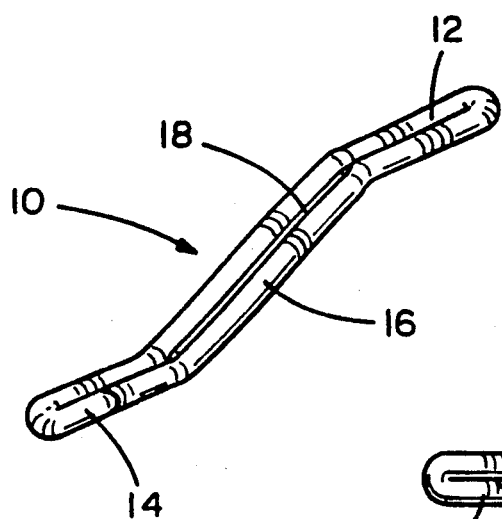
FIG. 2 is a perspective view of the strap mount of FIG. 1.
Figure 12:
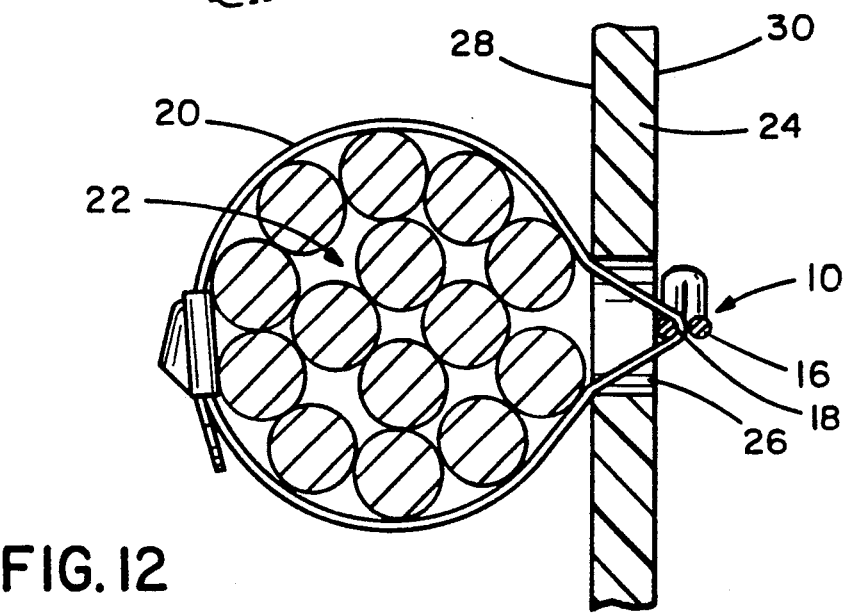
FIG. 12 is a view of the strap mount of FIG. 11 secured around the bundle.

As can be seen in FIGS. 1 and 12, strap mount 10 might have the extended end sections abutting the surface of the structure (FIG. 1) or it could rotate to its side and abut the structure (FIG. 12). The actual abutting side is partially dependent upon how tightly the strap is tightened around the bundle.

While the particular embodiments of the present invention have been shown and described, it will be obvious to those skilled in the art that changes and modifications may be made without departing from the invention in its broader aspects. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A strap mount for securing a bundle to an apertured mounting surface comprising:
   a mount member formed from a single piece of metal into a generally elongated loop having a pair of spaced apart substantially parallel extended end sections and an oblique central loop section therebetween including a single generally elliptical passageway.

2. A strap mount according to claim 1, wherein the mount member is integrally formed.

3. A strap mount according to claim 2, wherein the mount member is formed of an annealed stainless steel.

4. A strap mount according to claim 2, wherein the pair of extended end sections are spaced apart a distance sufficiently smaller than the length of the mount member to allow for the strap mount to be passed completely through a hole in a structure in a direction along an axis substantially parallel to the pair of extended end sections; and
   wherein the length of the mount member is sufficiently long to abut against a surface of the structure to prevent the strap mount from passing through the hole in the structure when the strap mount is oriented such that the extended end sections are substantially perpendicular to an axis of the hole in the structure.

5. A strap mount according to claim 2, wherein the mount member is shaped such that the strap mount and a strap inserted within the passageway of the central loop section is positionable so that after engagement the strap mount and the strap will have a sufficiently small narrowness to fit through a hole in a structure and then be positioned so that the strap mount will not come back through the hole to allow a bundle of wires to be supported against the structure.

6. A strap mount comprising:
   a mount member formed from a single piece of rod-like metal into an elongated loop having a pair of parallel extended end sections and a central section therebetween including a single generally elliptical passageway,
   wherein the central section is oblique to the pair of extended end sections.

7. A strap mount according to claim 6, wherein the mount member is integrally formed.

8. A strap mount according to claim 7, wherein the mount member is formed of an annealed stainless steel.

* * * * *